(12) United States Patent
Günther et al.

(10) Patent No.: US 7,859,651 B2
(45) Date of Patent: Dec. 28, 2010

(54) OPTICAL RANGE FINDER

(75) Inventors: Andreas Günther, Bargteheide (DE);
Helmut Themel, Waldkirch (DE)

(73) Assignee: SICK AG, Waldkirch/Breisgau (DE)

( * ) Notice: Subject to any disclaimer, the term of this patent is extended or adjusted under 35 U.S.C. 154(b) by 318 days.

(21) Appl. No.: 12/149,684

(22) Filed: May 6, 2008

(65) Prior Publication Data

US 2009/0079958 A1    Mar. 26, 2009

(30) Foreign Application Priority Data

May 7, 2007    (EP) .................................. 07009180

(51) Int. Cl.
*G01C 3/08* (2006.01)
(52) U.S. Cl. .................................... 356/5.01
(58) Field of Classification Search ................. 356/5.01
See application file for complete search history.

(56) References Cited

U.S. PATENT DOCUMENTS

| | | | |
|---|---|---|---|
| 4,224,583 A | | 9/1980 | Larkin |
| 5,612,779 A | | 3/1997 | Dunne |
| 7,030,968 B2 | | 4/2006 | D'Aligny et al. |
| 7,050,724 B1 | * | 5/2006 | Rantakari .................... 398/209 |
| 2003/0160655 A1 | * | 8/2003 | Raddant et al. ............. 330/145 |
| 2004/0157575 A1 | | 8/2004 | Kim |
| 2007/0097349 A1 | * | 5/2007 | Wada et al. ................. 356/4.06 |
| 2007/0296951 A1 | * | 12/2007 | Kuijk et al. ................. 356/5.02 |

FOREIGN PATENT DOCUMENTS

| | | |
|---|---|---|
| DE | 43 40 756 | 6/1994 |
| DE | 10 2004 031 024 | 1/2006 |
| EP | 0 484 064 | 5/1992 |
| EP | 0 747 727 | 12/1996 |
| EP | 0 793 115 | 9/1997 |
| EP | 1 262 906 | 12/2002 |
| JP | 07123048 | 5/1995 |

* cited by examiner

*Primary Examiner*—Thomas H Tarcza
*Assistant Examiner*—Luke D Ratcliffe
(74) *Attorney, Agent, or Firm*—The Nath Law Group; Jerald L. Meyer; Stanley N. Protigal

(57) ABSTRACT

The invention relates to an optical range finder comprising a light transmitter for the transmission of measurement light into a monitored space, a light receiver for the reception of measurement light reflected or remitted by an object in the monitored space, and an evaluation circuit to determine the time of flight of the measurement light from the output signal and to determine the distance of the object therefrom. In accordance with the invention, a PIN diode circuit is provided between the light receiver and the evaluation circuit and is electrically connected to them, with the PIN diode circuit damping the current output signal of the light receiver. The invention furthermore relates to an optical range finding method which can be carried out with the optical range finder in accordance with the invention.

14 Claims, 4 Drawing Sheets

OPTICAL RANGE FINDER

Figure 1:
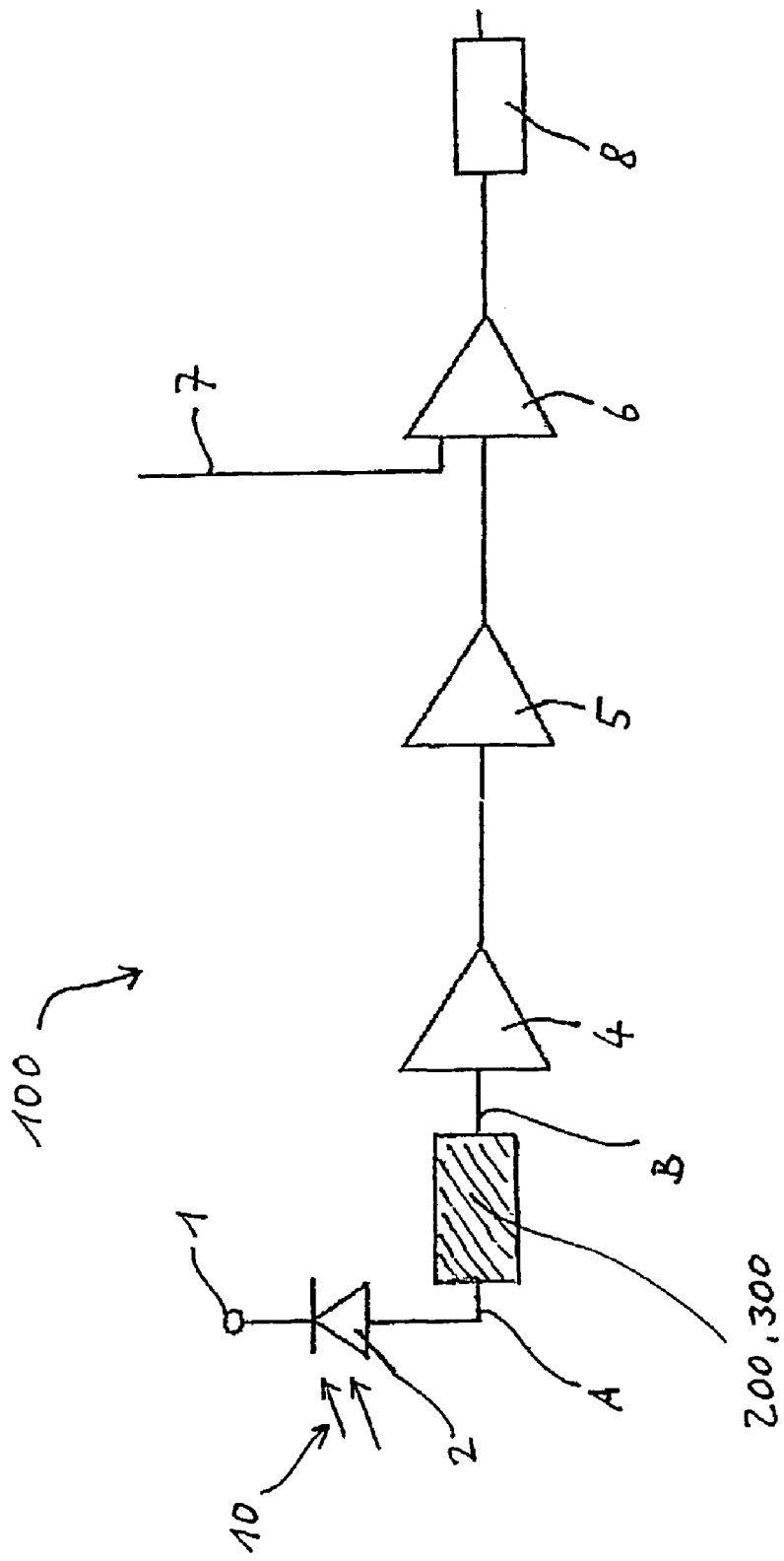

This application claims foreign priority benefits under 35 U.S.C. §119 of European Patent Application No. 07 009 180.6, filed May 7, 2007, the contents of which are hereby incorporated in their entirety.

The present invention relates to an optical range finder comprising a light transmitter for the transmission of measurement light into a monitored space, a light receiver for the reception of measurement light reflected or remitted by an object in the monitored space and for the generation of an electrical output signal, and an evaluation circuit connected to the light receiver to determine the time of flight of the measurement light from the latter's output signal and to derive the distance of the object from it. The invention further relates to a corresponding range finding method.

Such optical range finders determine the distance of an object from the time of flight of the measurement light while taking account of the speed of light and are therefore also called time-of-flight detectors (TOF detectors).

The transmitted measurement light can consist of individual light pulses whose time of flight is measured (pulse time of flight method). Such methods are described, for example in DE 10 2004 031 024 B4, DE 43 40 756 A1 or EP 0 793 115 B1. Other methods use modulated continuous light (continuous wave time of flight method) such as is described in EP 0 747 727 B1 or EP 1 262 906 B1, with the phase shift of the received light with respect to the transmitted light being evaluated.

For the purposes of the present text, the term "light" is not only used for visible light, but can also designate electromagnetic radiation in other frequency ranges (for example, infrared or ultraviolet radiation).

One-dimensional distance sensors in which the measurement light is transmitted in a direction and is detected can be used for the distance determination. A rotatable or pivotable deflection mirror such as is described in EP 0 793 115 B1 can be used to generate a two-dimensional or three-dimensional monitored space.

The light receiver must be able to detect low received signals with sufficient precision to also correctly determine the distance of objects having low reflectivity or remittance. This requires a high reception sensitivity of the evaluation circuit which is usually achieved by using a pre-amplifier. In contrast, objects having high reflectivity or remittance generate high received signals at the light receiver having a very high amplitude which can overload the pre-amplifier of the evaluation circuit and can have the result that the evaluation circuit works with a distorted signal.

The electrical signal converted in the electrooptical converter can thus achieve a dynamic range within the working range of the sensor of e.g. more than 80 dB, whereas the electronic signal processing adapted as a rule to the lowest signal strength generally has a much lower dynamic range. A dramatic overload resulting at higher signal strengths can then result in substantial errors in the following signal evaluation.

Known sensors counter this general problem in different manners:

The laser range finder disclosed in DE 43 40 756 A1 determines the peak value of the received light pulse and makes time of flight corrections with reference to the amplitude. The linear amplification range of an evaluation stage connected after the optoelectronic photo-receiver as a rule can, however, result in time of flight measurement errors, with the linear amplification range being limited as a rule in comparison with the signal dynamics occurring in practice, so that the compensation can only be used in a relatively small level control range in dependence on the measured peak value.

DE 10 2004 031 024 B4 discloses an optical sensor which determines the vertex of a received light pulse by two time of flight measurements. For this purpose, the points in time are measured at which a received light pulse exceeds and falls below a threshold value again. A mean value is determined from this which approximates the point in time of the vertex which forms the basis for the calculation of the distance. On an overload of the electronic processing stage, a correction value is additionally used whose magnitude depends on the measured received light pulse width.

A laser range finder disclosed in EP 0 793 115 B1 determines the electrical charge flowing during the reception via the photodetector or the pulse width of the received light pulse before the signal evaluation and carries out a time of flight measurement error compensation with reference to these values.

Furthermore, a non-linear amplitude limitation (clamping diodes) of the received signal can be used to prevent an overload of the electronic signal evaluation, whereby further errors to be compensated can, however, arise.

Other solutions use e.g. electromechanically adjustable optical damping elements before the light receiver which, however, slow down the optical distance measurement.

Finally, the matching of the transmission power of the transmitted measurement light is known to avoid the overload of the signal evaluation. However, due to limited adjustment possibilities of the light transmitter, this approach frequently does not provide the desired dynamic range.

In other methods, the signal evaluation path is designed with variable amplification values to increase the dynamic range of the evaluation circuit. In this connection, care must be taken that the first stage of the signal evaluation is not overloaded.

The known solutions additionally require a substantial calibration effort and teach-in effort.

It is the object of the invention to provide an optical range finder and a range finding method which enable a distance measurement which is precise as possible with a calibration effort which is as low as possible while using a time of flight method.

An optical range finder having the features of claim 1 and a method in accordance with claim 12 are provided to satisfy this object. Advantageous embodiments and expedient further developments of the invention are described in the dependent claims.

An optical range finder in accordance with the invention has a PIN diode circuit having at least one PIN diode between the light receiver and the evaluation circuit. The measurement light reflected back or remitted back from the monitored space is received by the light receiver and converted into an electrical current output signal which is forwarded to the PIN diode circuit. The PIN diode circuit damps this output signal before it is forwarded to the evaluation circuit. The current output signal of the light receiver as a rule comprises one or more current pulses.

PIN diodes include an n doped semiconductor region and a p doped semiconductor region having an intrinsic region disposed therebetween. Their radio frequency resistance is adjustable by the magnitude of an imposed DC current. PIN diodes are especially suitable in particular also to deal with high pulse currents at a typical signal spectrum in the GHz range without exerting a capacitive load on a signal path adjoining the light receiver.

The amplitude of the electrical current output signal of the light receiver can be damped almost without delay and without distortion so much using the PIN diode circuit that the electronic signal evaluation of the following evaluation circuit is not overloaded. It is thus possible largely to dispense with the previously mentioned complex and/or expensive compensation methods and the calibration can be greatly simplified.

Signal distortion due to overloads are prevented so that the signal shape is transferred in unfalsified form to the following signal evaluation units despite the damping.

A preferred embodiment of the invention uses an analog/digital converter in the evaluation circuit to change the damped received signal, and preferably also a reference signal derived from the transmitted measurement light, into a digital value of high resolution, whereby a very precise time determination is made possible.

In a preferred further development, for example, a transimpedance amplifier is used as a first stage of the evaluation circuit. The current signal guided from the light receiver over the PIN diode circuit is thus converted into a voltage signal which is used by subsequent components of the evaluation circuit.

An embodiment of the invention transmits one or more light pulses as the measurement light. The reflected or remitted light pulses are reshaped into electrical signals in the light receiver and are e.g. compared in the evaluation circuit with reference pulses derived from the originally transmitted reference pulses to determine the pulse time of flight from the delay and the object distance from this with the help of the speed of light.

An alternative embodiment of the invention uses continuous modulated measurement light whose phase shift caused by the flight of light time in the monitored space is evaluated. For example, for this purpose, a resonant circuit can be formed from the light transmitter, the measurement distance, the light receiver, a filter component with a phase response and optionally from further components, with the resonant frequency of said resonant circuit being imposed on the transmitted modulated light. The resonant frequency depends on the phase shift of the light along the measurement distance so that the distance of the object can be determined from it.

Particularly preferred embodiments use a PIN diode circuit having at least one PIN diode which is connected, on the one hand, to RF ground (radio frequency ground) and, on the other hand, to the electrical received signal forwarded by the light receiver. A DC current is preset by the at least one PIN diode via an additional circuit, e.g. using a regulatable DC current source, said DC current determining the resistance value of the PIN diode in the radio frequency range. The circuit thus acts as a load resistance in the radio frequency range which damps the current amplitude of the electrical received signal in an adjustable manner. A plurality of PIN diodes connected in parallel with respective resistances can also be used to expand the dynamic range of the damping circuit.

Preferred embodiments use a Schottky diode in the PIN diode circuit which is connected between the at least one DC current source and the at least one PIN diode. In addition, with such embodiments, a connection point can be provided between the DC current source and the Schottky diode and a capacitor coupled to RF ground is connected to said connection point.

In the switched through state, the Schottky diode has a low resistance and then acts together with the capacitor, which is connected to RF ground, as an additional damping element to the at least one PIN diode.

The invention moreover relates to a method for optical range finding in which measurement light is transmitted into a monitored space and the measurement light reflected or remitted where appropriate by an object is received with the help of a light receiver and is converted into an electrical current output signal. The electrical output signal of the light receiver is damped with the help of a PIN diode circuit before the evaluation with the help of an evaluation circuit for the determination of the distance of the optical range finder from the object.

Advantages of the method in accordance with the invention, particular embodiments of the method in accordance with the invention and their advantages result from the embodiments of the optical range finder in accordance with the invention described above.

A further development of the method in accordance with the invention in particular makes provision that one or more regulatable DC current sources are used to apply a DC current to the diode or the diodes of the PIN diode circuit. The resistance of the diode or diodes can be set by setting the DC current to a desired value, whereby the damping of the electrical current output signal of the light receiver is determined. An overload of the evaluation circuit can thus be prevented.

The required damping of the PIN diode circuit, i.e. in particular the current value of the adjustable DC current source(s) to be set, can be determined by pre-trials. This can take place, for example, by a teach-in process or by means of a test run with reference to which the evaluation circuit determines the then current overload and e.g. sets the corresponding values in a suitable manner via an integrated control circuit so that the connected evaluation circuit is no longer overloaded.

Alternatively, the control of the PIN diode or of the PIN diodes takes place interactively during the measurement procedure.

Figure 2:
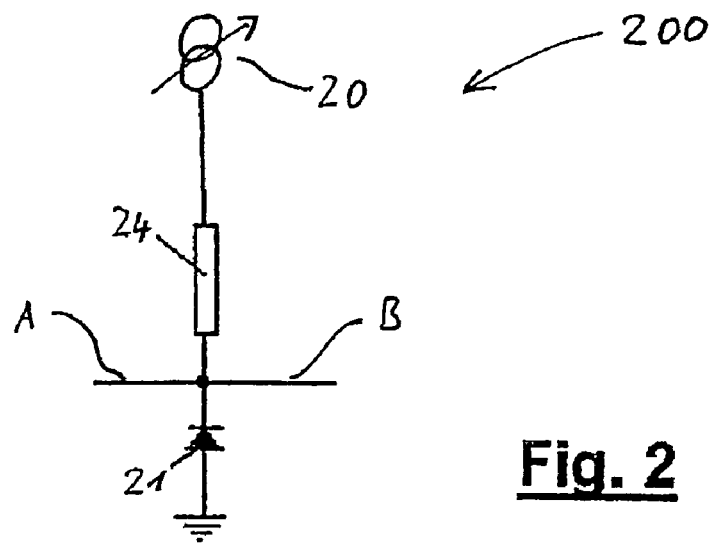
Figure 3:
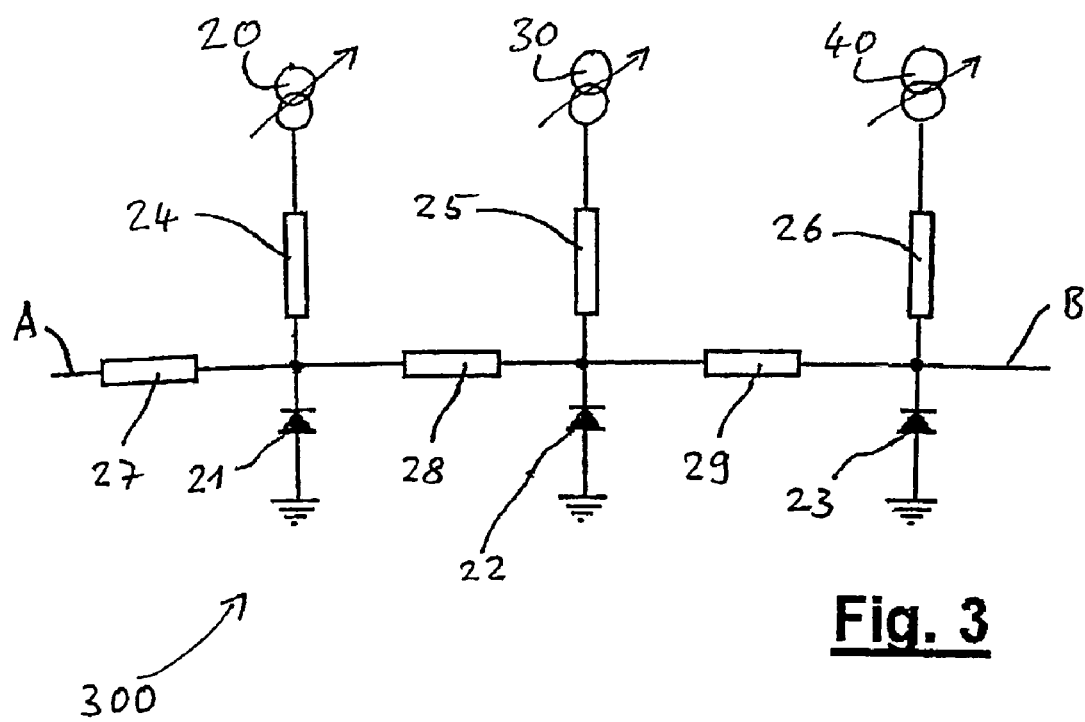
Figure 4:
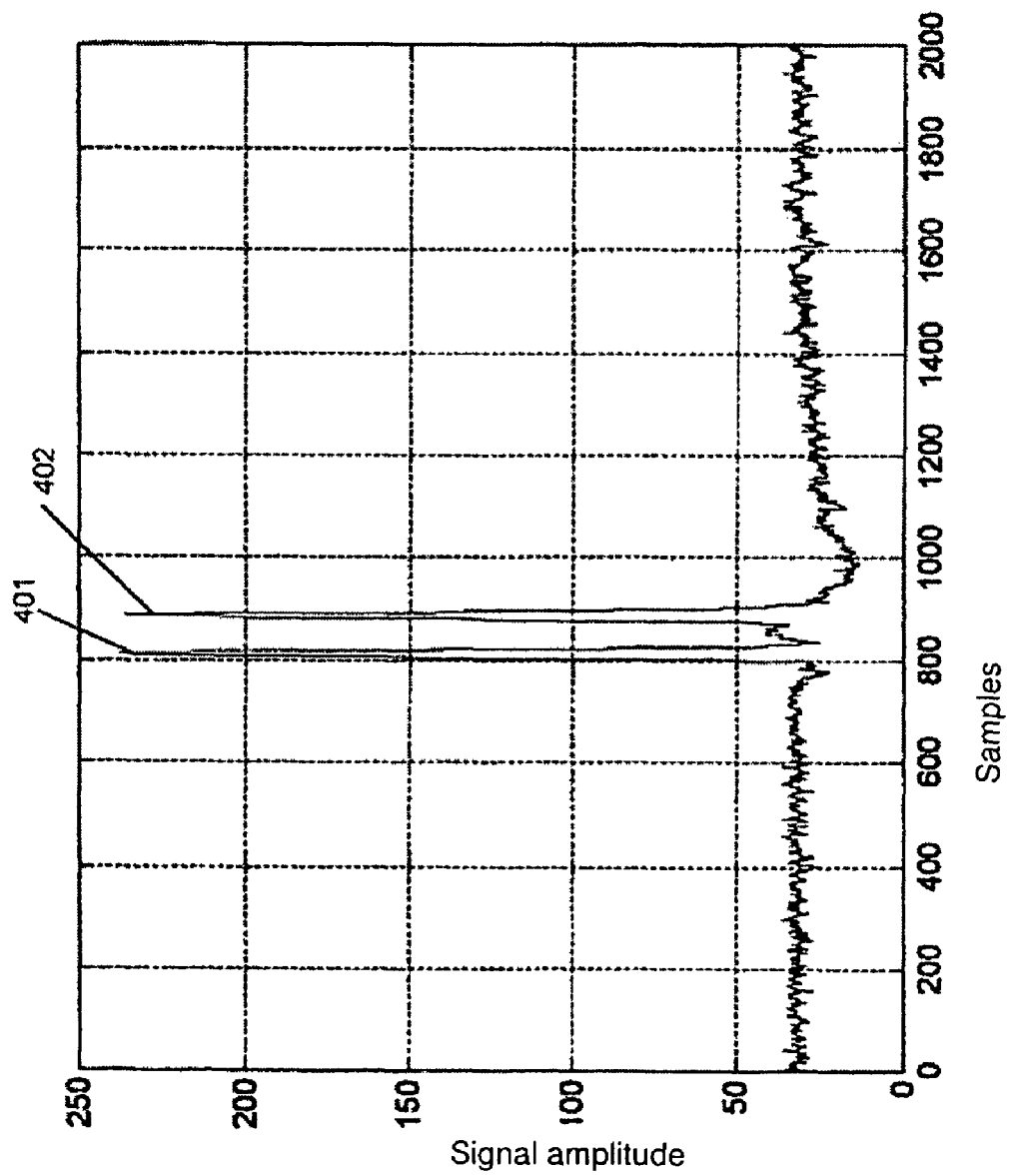
Figure 5:
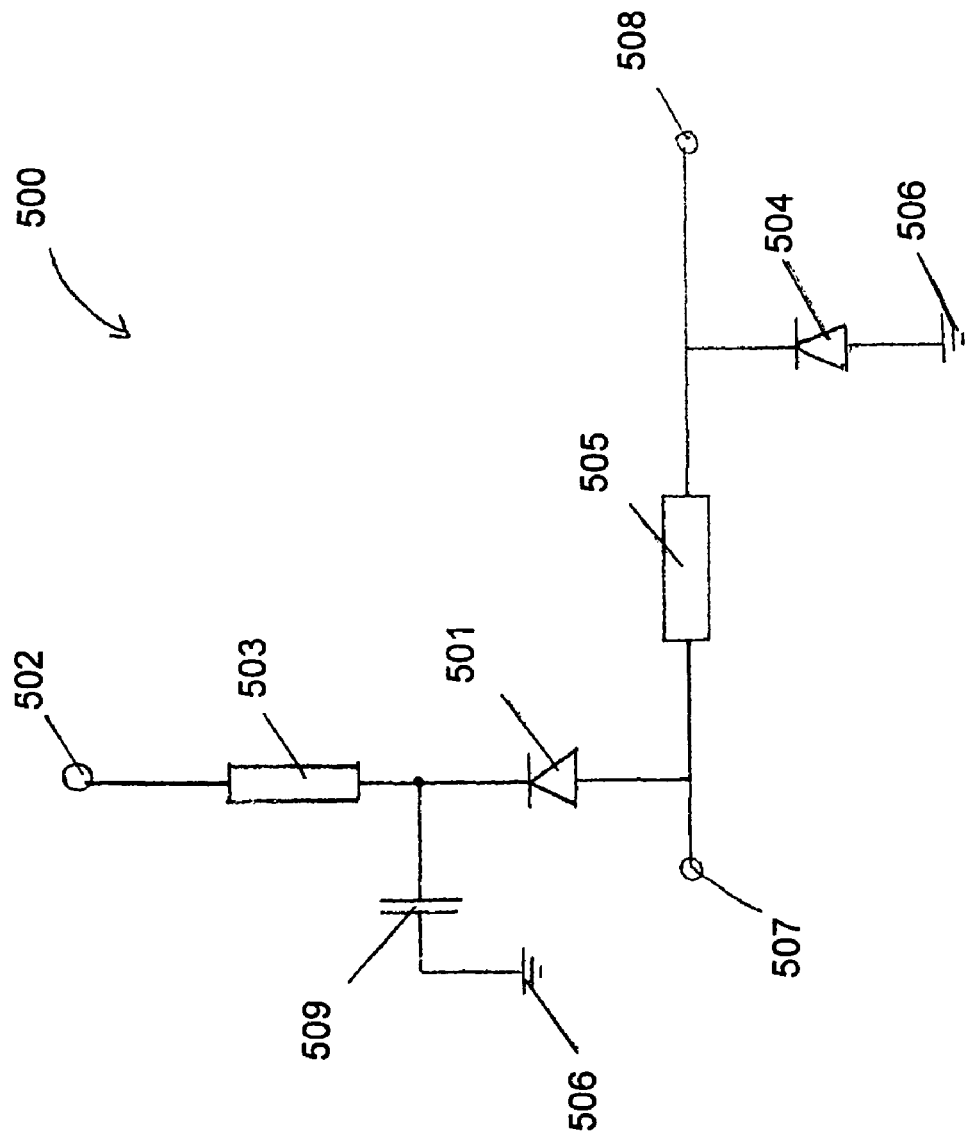

The invention will be described in the following with reference to the drawings. There are shown in these:

FIG. 1 the schematic structure of a received signal path of an optical range finder designed in accordance with the invention;

FIG. 2 a schematic diagram of a PIN diode circuit of a first embodiment;

FIG. 3 a schematic diagram of a PIN diode circuit of a second embodiment;

FIG. 4 signals of a reference pulse and of an associated received pulse sampled by the analog/digital converter;

FIG. 5 a schematic diagram of a PIN diode circuit of an embodiment using an additional Schottky diode.

The received signal path 100 shown in FIG. 1 of an optical range finder for the pulse time of flight method includes a DC voltage source 1 for the supply of the light receiver which in this example comprises an avalanche photodiode 2. On incidence of a measurement light pulse 10 reflected or remitted by an object (not shown) in a monitored space (not shown), the avalanche photodiode 2 generates a current signal which is received by the PIN diode circuit 200, 300 and is damped as will be explained in more detail further below.

The damped current signal is forwarded to a first processing stage which is formed in the example by a transimpedance amplifier 4. The signal is forwarded from this as a voltage signal to a summer 6. An amplifier 5 having an adjustable amplification factor can be provided between the transimpedance amplifier 4 and the summer 6. The summer 6 adds a reference pulse 7 which is derived from the measurement light pulse transmitted into the monitored space as a reference starting point. The output signal of the summer 6 is passed onto an analog/digital converter 8 which reshapes the pulsed signals into digital values so that they can be evaluated, for example, by a computer (not shown). The input signal of the analog/digital converter is shown in FIG. 4 and consists of the peak 401 which corresponds to the reference pulse 7 and of the peak 402 which corresponds to the received signal.

FIG. 2 shows a first embodiment 200 of the PIN diode circuit. The connection A comes from the current output of the light receiver 2, whereas the connection B leads to the current input of the transimpedance amplifier 4. The circuit here includes a PIN diode 21 which is connected to the RF ground, on the one hand, and to the signal path, on the other hand. An adjustable DC current source is likewise connected to the signal path via an impedance coupling member 24. At high frequencies, the PIN diode essentially acts as a resistor with a variable resistance value, with the resistance value being preset by the DC current imposed by the current source 20.

In the alternative embodiment 300 of the PIN diode circuit shown in FIG. 3, three PIN diodes 21, 22, 23 connected in parallel are provided which are connected via corresponding impedance coupling members 24, 25, 26 to adjustable DC current sources 20, 30, 40. The connection A here also comes from the current output of the light receiver and the connection B leads to the transimpedance amplifier 4. The principle of action of this circuit is similar to that of the embodiment of FIG. 2, with the dynamic range being increased by the cascading. A different number of PIN diodes can naturally also be provided to obtain a dynamic range corresponding to the demands.

In an embodiment which is not shown, the plurality of PIN diodes are connected to a common DC current source via corresponding impedance coupling members.

The embodiments described above are used as follows.

A light pulse is transmitted into a monitored one to be monitored in a manner known per se. The light source used for this purpose and not shown here is arranged spatially close to the receiver circuit shown in FIG. 1 and in particular forms an integral unit together with it in a known manner.

An object located in the monitored space reflects or remits the light pulse which is received by the avalanche diode 2 as a received light pulse 10. The electrical current output signal generated by the avalanche diode 2 is forwarded to the PIN diode circuit 200, 300.

The pulsed current output signal (also called an "electrical current received pulse" in the following) is partly deflected toward RF ground by the PIN diode 21 (FIG. 2) or the PIN diodes 21, 22, 23 (FIG. 3). The electrical current received pulse energetically reduced in this manner is converted into a voltage signal by the transimpedance amplifier 4. It is ensured by the damping of the electrical current received pulse with the help of the PIN diode circuit 200, 300 connected before it that the transimpedance amplifier 4 is not overloaded.

The voltage output signal of the transimpedance amplifier 4 is guided via an adjustable amplifier 5 to a summer 6. Here, a reference pulse which is added to the voltage signal and which is derived from the measurement light pulse transmitted to the monitored space is fed in at the input 7.

The signal arising is shown in FIG. 4. Curves are shown which were sampled over the analog/digital converter 8. The peak 401 corresponds to the reference pulse derived from the measurement light pulse transmitted into the monitored space. The peak 402 corresponds to the received light pulse 10 received by the avalanche diode 2, offset in time with respect to the transmitted measurement light pulse and damped after conversion into an electrical signal with a PIN diode circuit 200, 300 provided in accordance with the invention. The two peaks have almost identical amplitude levels and curve shapes and can therefore be evaluated very precisely. It becomes clear that the received signal was damped by the PIN diode circuit such that it lies in the dynamic range of the signal evaluation without a non-linear distortion/limitation.

The signal is converted into a digital signal with the help of the analog/digital converter 8

The time of flight of light in the monitored space can be calculated from the interval of the pulses. Finally, the distance of the object from the optical range finder can be determined from this with the help of the speed of light (distance=speed of light*time of flight/2). These calculations and determinations can e.g. be carried out automatically using a suitable processor.

One or more pre-trials can, for example, be carried out to coordinate the damping of the PIN diodes. In this connection, the magnitude of the overload is first determined without damping and the resistance of the PIN diodes suitable for the desired damping effect can be determined from this. The required DC current through the PIN diodes can be determined from this. Alternatively, the respective current value to be set can be determined iteratively during the measurement.

The schematic diagram shown in FIG. 5 shows a simplified representation of a PIN diode circuit 500 with an additional Schottky diode 501 which is connected between a DC current source, which is formed in the example shown by a DC voltage source 502 together with a resistor 503, and the PIN diode 504. A DC voltage is delivered from the DC voltage source 502 and is reshaped via the resistor 503 to a DC current which is limited by the resistance, and which flows through the Schottky diode 501, a further resistor 505 and through the PIN diode 504, provided that the Schottky diode is operated in the transmission direction. When the DC voltage source is operated with a positive potential or a zero potential with respect to the RF ground 506, the Schottky diode 501 blocks and no DC voltage flows through the PIN diode so that a current pulse arriving at the connector 507 from the photodiode (not shown) runs almost without damping through the PIN diode circuit 500 and arrives at the connector 508 which leads, for example, to a transimpedance converter.

When the DC voltage source 502 is, however, operated with a negative voltage which is large enough to switch through the Schottky diode, a DC current flows through the PIN diode 504, whereby a damping of the PIN diode circuit 500 is reached. Since the Schottky diode 501 has a very low resistance in the switched through state and since it counts as one of the "fast" diodes due to its structure, i.e. those diodes which react quickly to radio frequency signal changes, it will additionally damp a current pulse arriving at the connector 507 in that it deflects some of the charge of the current pulse over the capacitor 509 to the RF ground 506.

A use of Schottky diodes in the PIN diode circuit in accordance with the invention thus additionally damps the desired damping effect.

The arrangement in accordance with the invention with a PIN diode circuit can advantageously be used with sensors which operate in accordance with the pulse time of flight method or in accordance with the continuous wave time of flight method. A use is possible both with one-dimensional and with multi-dimensional range finders.

With the arrangement in accordance with the invention, the particularly simple and precise evaluation of a signal is possible with the help of an analog/digital converter in the form of a voltage signal, with a current signal first being provided by the receiver. The subsequent electronic signal evaluation slightly tending to overload (in particular e.g. a current/voltage converter or transimpedance amplifier) is nevertheless not overloaded thanks to the damping by the interposed PIN diode circuit.

REFERENCE NUMERAL LIST

1 DC voltage source
2 photodiode
4 transimpedance amplifier
5 adjustable amplifier
6 summer
7 reference pulse input
8 analog/digital converter
10 reflected measurement light
20 adjustable DC current source
21, 22, 23 PIN diode
24, 25, 26 impedance coupling member
27, 28, 29 resistor
30, 40 adjustable DC current source
100 received signal path
200, 300 PIN diode circuit
401 reference pulse
402 received pulse
500 PIN diode circuit
501 Schottky diode
502 DC voltage source
503, 505 resistor
504 PIN diode
506 RF ground
507, 508 connectors
509 capacitor
A, B connections

The invention claimed is:

1. An optical range finder comprising
a light transmitter for the transmission of measurement light into a monitored space;
a light receiver (2) for the reception of measurement light reflected or remitted by an object in the monitored space and for the generation of an electrical output signal; and
an evaluation circuit which is connected to the light receiver to determine the time of flight of the measurement light from its output signal and to derive the distance of the object from it, characterized by
a PIN diode circuit (200, 300, 500) arranged between the light receiver (2) and the evaluation circuit, electrically connected to them and having at least one PIN diode (21, 22, 23, 504), with the PIN diode circuit damping the current output signal of the light receiver.

2. An optical range finder in accordance with claim 1, characterized in that the evaluation circuit includes an analog/digital converter (8).

3. An optical range finder in accordance with claim 1, characterized in that the evaluation circuit includes a transimpedance amplifier (4).

4. An optical range finder in accordance with claim 1, characterized in that the light transmitter is designed for the transmission of pulsed measurement light and the evaluation circuit is designed for the determination of the object distance from the pulse delay.

5. An optical range finder in accordance with claim 1, characterized in that the light transmitter is designed for the transmission of modulated, continuous measurement light and the evaluation circuit is designed for the determination of the object distance from the phase shift between transmitted and received measurement light.

6. An optical range finder in accordance with claim 1, characterized in that the PIN diode circuit (200, 300, 500) includes at least one PIN diode (21, 22, 23, 504) which is connected to RF ground.

7. An optical range finder in accordance with claim 1, characterized in that the at least one PIN diode (21, 22, 23, 504) is connected to at least one DC current source (20, 30, 40) to set a DC current through the at least one PIN diode (21, 22, 23, 504).

8. An optical range finder in accordance with claim 7, characterized in that the at least one DC current source (20) can be regulated.

9. An optical range finder in accordance with claim 1, characterized in that the PIN diode circuit (200, 300, 500) includes a plurality of PIN diodes (21, 22, 23, 504) connected in parallel.

10. An optical range finder in accordance with claim 1, characterized in that a Schottky diode (501) is connected in the PIN diode circuit (500) between the at least one DC current source and the at least one PIN diode (504).

11. An optical range finder in accordance with claim 10, characterized in that a connection point at which a capacitor (509) coupled to RF ground (506) is provided between the at least one DC current source and the Schottky diode (501).

12. A method for optical range finding comprising the following steps:
transmitting measurement light into a monitored space;
receiving measurement light reflected or remitted where appropriate by an object with the help of a light receiver and converting into an electrical signal;
damping the electrical signal of the light receiver with a PIN diode circuit (200, 300, 500) having at least one PIN diode (21, 22, 23, 504); and
evaluating the time of flight of light of the measurement light for the determination of the distance of the object.

13. A method in accordance with claim 12, characterized in that the adjustment of the damping effect of the PIN diode circuit (200, 300, 500) is carried out by setting a DC current through the PIN diode (21, 504) or PIN diodes (21, 22, 23).

14. A method in accordance with claim 13, characterized in that the respective DC current is determined by pre-trials such that the electrical signal is damped such that an evaluation circuit for the evaluation of the received light signal is not overloaded.

* * * * *